United States Patent
Yamazaki et al.

(10) Patent No.: US 11,251,870 B2
(45) Date of Patent: Feb. 15, 2022

(54) OPTICAL TRANSMISSION SYSTEM

(71) Applicant: NIPPON TELEGRAPH AND TELEPHONE CORPORATION, Tokyo (JP)

(72) Inventors: Etsushi Yamazaki, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/049,558

(22) PCT Filed: Apr. 9, 2019

(86) PCT No.: PCT/JP2019/015428
§ 371 (c)(1),
(2) Date: Oct. 21, 2020

(87) PCT Pub. No.: WO2019/208196
PCT Pub. Date: Oct. 31, 2019

(65) Prior Publication Data
US 2021/0242942 A1 Aug. 5, 2021

(30) Foreign Application Priority Data
Apr. 24, 2018 (JP) .............................. JP2018-082934

(51) Int. Cl.
| H04B 10/50 | (2013.01) |
| H04B 10/27 | (2013.01) |
| H04B 10/80 | (2013.01) |
| H04J 14/02 | (2006.01) |

(52) U.S. Cl.
CPC ............ H04B 10/27 (2013.01); H04B 10/503 (2013.01); H04B 10/80 (2013.01); H04J 14/02 (2013.01)

(58) Field of Classification Search
CPC .......................... H04B 10/505; H04B 10/5053
See application file for complete search history.

(56) References Cited

U.S. PATENT DOCUMENTS 5,253,309 A * 10/1993 Nazarathy .............. H04B 10/25
385/1
2020/0393705 A1* 12/2020 Stark ..................... G02F 1/0123

OTHER PUBLICATIONS

Senta Suzuki et al., Research and Development of Digital Coherent Signal Processing Technology for Large-capacity Integrated Reported Optical Communications Networks; Journal of the Institute of Electronica, Information and Communication Engineers; pp. 1100-1116; Dec. 2012.

* cited by examiner

Primary Examiner — Shi K Li
(74) Attorney, Agent, or Firm — Harness, Dickey & Pierce, P.L.C.

(57) ABSTRACT

An optical transmission system includes an optical transmitter configured to generate a plurality of optical signals encoded and modulated with the same client data being carriers with the same wavelength, and having different carrier phases, and output the plurality of generated optical signals using a plurality of optical transmitter output ports, each of the optical transmitter output ports corresponding to one of the plurality of optical signals, and one or a plurality of first directional couplers including a plurality of first input ports, each of the first input port connected to a corresponding one of the plurality of optical transmitter output ports.

7 Claims, 4 Drawing Sheets

OPTICAL TRANSMISSION SYSTEM

CROSS-REFERENCE TO RELATED APPLICATIONS

This application is a 371 U.S. National Phase of International Application No. PCT/JP2019/015428, filed on Apr. 9, 2019, which claims priority to Japanese Application No. 2018-082934 filed on Apr. 24, 2018. The entire disclosures of the above applications are incorporated herein by reference.

TECHNICAL FIELD

The present invention relates to an optical transmission system.

BACKGROUND ART

With the spread of Fiber to the Home (FTTH) and smartphones, there has been an increasing demand for a large capacity and more economical optical network accommodating rapidly increasing data traffic.

For realization of such an optical network, a digital coherent technology for realizing practical coherent detection using digital optical signals is attracting attention in addition to research and development, and the practical use of such is accelerating (for example, Non-Patent Literature 1). The digital coherent technology is a technology for actively applying and developing digital signal processing put into practical use in wireless fields to optical fiber communication. With coherent detection, reception sensitivity and frequency utilization efficiency are improved, and signal distortion compensation performance in long-distance optical fiber transmission, which has been difficult in the related art, are greatly improved.

However, in communication in the optical network, an optical signal arriving at a point (node) serving as a branch point may be transmitted to a plurality of points. For example, an optical signal $\lambda 1$ and an optical signal $\lambda 2$ transmitted from a point A may arrive at a point B, which is a branch point, the optical signal $\lambda 1$ may be transmitted to the point C, and the optical signal $\lambda 2$ may be transmitted to the point D. Further, for example, the optical signal $\lambda 1$ and the optical signal $\lambda 2$ transmitted from the point A and an optical signal $\lambda 3$ and an optical signal $\lambda 4$ transmitted from a point E may arrive at the point B, which is the branch point, an optical signal obtained by multiplexing the optical signal $\lambda 1$ and the optical signal $\lambda 3$ may be directed and transmitted to the point C, and an optical signal obtained by multiplexing the optical signal $\lambda 2$ and the optical signal $\lambda 4$ may be directed and transmitted to the point D.

In coherent optical communication, an optical cross-connection device may be used when transfer paths (hereinafter referred to as "paths") of a plurality of optical signals are controlled as described above. The optical cross-connection device may set a different path for each wavelength by assigning a signal for each wavelength and demultiplexing a wavelength at each point. In general, the optical cross-connection device demultiplexes a plurality of arriving optical signals into a plurality of optical signals with different wavelengths, for example, using a wavelength selection device, such as a grating. The optical cross-connection device classifies the plurality of demultiplexed optical signals into respective paths using an optical switch or the like. The optical cross-connection device combines the plurality of optical signals to be transmitted to the same path.

CITATION LIST

Non Patent Literature

Non-Patent Literature 1: Suzuki Ohta and others, "Comprehensive Report: Research and Development of Digital Coherent Signal Processing Technology for Large Capacity of Optical Communication Network (総合報告 光通信ネットワークの大容量化に向けたディジタルコヒーレント信号処理技術の研究開発)," The Journal of the Institute of Electronics, Information and Communication Engineers, Vol. 95, No. 12, pp. 1100-1116, 2012

SUMMARY OF THE INVENTION

Technical Problem

However, in the related art, the optical signal is demultiplexed for each wavelength, but wavelength resolution based on a wavelength multiplexer and demultiplexer and a laser is limited. Thereby, because accuracy of a bandwidth per light wavelength path is limited, it becomes difficult to demultiplex an optical signal in units narrower than a certain constant bandwidth. Further, there is also a problem with frequency flatness of a transmission band of a wavelength selection switch and a wavelength multiplexer and demultiplexer. As long as wavelength selectivity of light is used, a signal spectrum is shaved because the frequency flatness of the transmission band is lost. This causes distortion in a signal waveform. Further, because noise addition also occurs, there is a problem in that an equalizer cannot compensate for the signal waveform.

Thus, in a device that controls optical signal paths for each wavelength, there is a problem in that optical signal path control cannot be accurately performed due to band constraints and wavelength dependence constraints in some cases.

In view of the foregoing, an object of the present invention is to provide a technology capable of performing optical signal path control without band constraints and wavelength dependence constraints.

Means for Solving the Problem

An aspect of the invention is an optical transmission system including: an optical transmitter configured to generate a plurality of optical signals encoded and modulated with the same client data being carriers with the same wavelength, and having different carrier phases, and output the plurality of generated optical signals using a plurality of optical transmitter output ports, each of the optical transmitter output ports corresponding to one of the plurality of optical signals; and one or a plurality of first directional couplers including a plurality of first input ports, each of the first input ports connected to a corresponding one of the plurality of optical transmitter output ports.

Further, an aspect of the invention is the optical transmission system, wherein the first directional coupler includes a plurality of first output ports, the optical transmission system further includes: a second directional coupler including a second input port connected to a first first output port, the first first output port being one of the plurality of first output ports, and a third directional coupler including a third input port connected to a second first output port, the second first output port being one of the plurality of first output ports different from the first first output port.

Further, an aspect of the invention is the optical transmission system, wherein the second directional coupler includes a second output port, the third directional coupler includes a third output port, and the optical transmission system further includes an optical receiver configured to coherently receive a plurality of optical signals output from the second output port or the third output port, and combine and decode the received plurality of optical signals.

An aspect of the present invention is an optical transmission system including: a first optical transmitter configured to generate a plurality of first optical signals encoded and modulated with the same first client data being carriers with the same wavelength, and having different carrier phases, and output the plurality of generated first optical signals using a plurality of first optical transmitter output ports, each of the first optical transmitter output ports corresponding to one of the plurality of first optical signals; a second optical transmitter configured to generate a plurality of second optical signals encoded and modulated with the same second client data different from the first client data and being carriers with the same wavelength, and having different carrier phases, and output the plurality of generated second optical signals using a plurality of second optical transmitter output ports, each of the second optical transmitter output ports corresponding to one of the plurality of second optical signals; a first directional coupler including a plurality of first input ports, each of the first input ports connected to a corresponding one of at least two of the plurality of first optical transmitter output ports, and a plurality of first output ports; a second directional coupler including a plurality of second input ports, each of the second input ports connected to a corresponding one of at least two of the plurality of second optical transmitter output ports, and a plurality of second output ports; a third directional coupler including a plurality of third input ports each of the third input ports connected to a corresponding one of a first first output port being one of the plurality of first output ports, a first second output port being one of the plurality of second output ports; and a fourth directional coupler including a plurality of fourth input ports, each of the fourth input ports connected to a corresponding one of at least one second first output port being the first output port different from the first first output port and being one of the plurality of first output ports, and at least one second second output port being the second output port different from the first second output port and being one of the second output ports.

Further, an aspect of the present invention is an optical transmission system including: an optical transmitter configured to generate four or more optical signals encoded and modulated with the same client data being carriers with the same wavelength, and having different carrier phases, and output the four or more generated optical signals using a plurality of optical transmitter output ports, each of the optical transmitter output ports corresponding to one of the four or more optical signals; one or a plurality of first directional couplers including a plurality of first input ports, each of the first input ports connected to a corresponding one of the plurality of first optical transmitter output ports being two or more optical transmitter output ports among the plurality of optical transmitter output ports, and a plurality of first output ports; one or a plurality of second directional couplers including a plurality of second input ports, each of the second input ports connected to a corresponding one of a plurality of second optical transmitter output ports being different from the first optical transmitter output ports and being two or more optical transmitter output ports among the plurality of optical transmitter output ports, and a plurality of second output ports; and a third directional coupler including a third input port connected to one of the plurality of first output ports, and a third output port; a fourth directional coupler including a fourth input port connected to one of the plurality of second output ports, and a fourth output port; and a fifth directional coupler including a plurality of fifth input ports, each of the fifth input ports connected to a corresponding one of the third output port and the fourth output port.

Further, an aspect of the present invention is an optical transmission system including: an optical transmitter configured to generate a plurality of optical signals encoded and modulated with the same client data being carriers with the same wavelength, and having different carrier phases, and output the plurality of generated optical signals using a plurality of optical transmitter output ports, each of the optical transmitter output ports corresponding to one of the plurality of optical signals, wherein a directional coupler configured to acquire the optical signals output from the plurality of optical transmitter output ports is connected to a multi-layer; and when the number of layers of the multi-layer is N, the number of the plurality of optical signals generated by the optical transmitter is equal to or greater than $2^N$.

Further, an aspect of the present invention is the optical transmission system and, for each of the plurality of optical signals, a plurality of optical signals obtained by overlapping a plurality of optical signals encoded and modulated with at least one or more other pieces of client data being carriers with the same wavelength as the plurality of optical signals, and having different carrier phases, is generated.

Further, an aspect of the present invention is the optical transmission system, wherein the first directional coupler detects a temporal variation in optical path length between transmission lines of a plurality of optical fibers and feeds information indicating the detected temporal variation back to the optical transmitter.

Effects of the Invention

According to the present invention, it is possible to perform optical signal path control without band constraints and wavelength dependence constraints.

DESCRIPTION OF EMBODIMENTS

In an optical transmission system according to each embodiment of the present invention to be described below, a wavelength selection device is not used and demultiplexing for each wavelength is not performed. A plurality of fibers are respectively connected to, for example, optical transmitter and optical receiver constituting an optical transmission system, and path control is performed by spatial coupling.

Specifically, the optical transmission system includes an optical transmitter and an optical coupling unit (hereinafter referred to as a "directional coupler"). The optical transmitter has a waveform generation function for generating a waveform for each wavelength. Further, the optical transmitter controls a phase of a carrier (hereinafter referred to as a "carrier phase") of an optical signal that is output to each optical fiber. When the directional coupler acquires the optical signal output from the optical transmitter, the directional coupler selects a path for the optical signal on the basis of the carrier phase.

Thus, in the optical transmission system according to each embodiment of the present invention to be described below, a pass band of the optical signal is not limited because demultiplexing is not performed for each wavelength. Further, in the optical transmission system according to the embodiment of the present invention, it is possible to collectively generate a plurality of optical signals to be output to different paths in the same wavelength signal by using digital signal processing. This allows wavelength granularity used for path selection to be set in fine granularity in, for example, gigahertz (GHz) units.

First Embodiment

Hereinafter, a first embodiment of the present invention will be described below with reference to the drawings.

Figure 1:
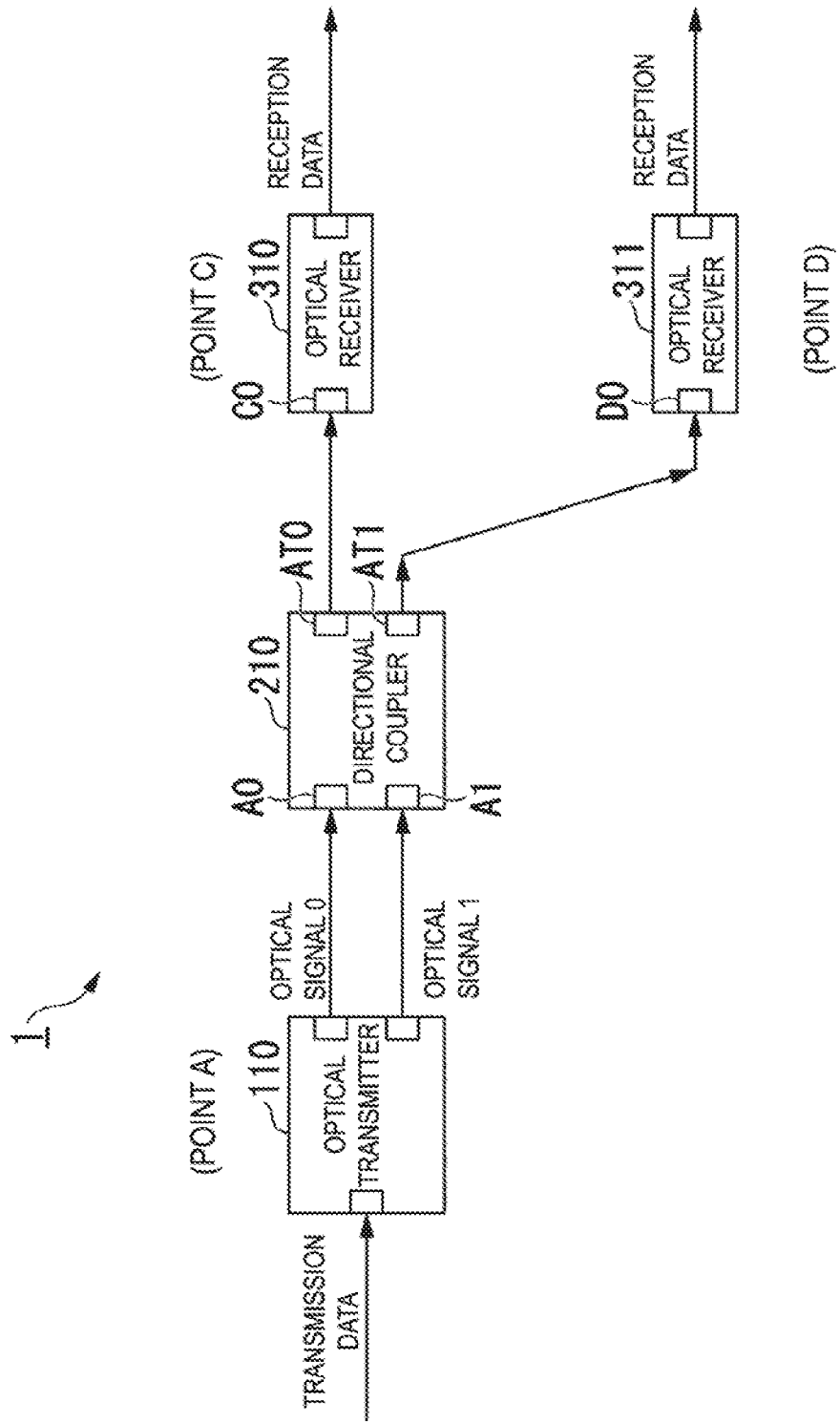
FIG. 1 is a block diagram illustrating a configuration of an optical transmission system 1 according to a first embodiment of the present invention.

FIG. 1 is a block diagram illustrating a configuration of an optical transmission system 1 according to the first embodiment of the present invention. As shown, the optical transmission system 1 includes an optical transmitter 110 installed at a point A, the directional coupler 210 (a first directional coupler), an optical receiver 310 installed at a point C, and an optical receiver 311 installed at a point D.

The optical transmission system 1 illustrated in FIG. 1 is an example of an optical transmission system including a directional coupler 210 with a two-path input and a two-path output. As shown, the directional coupler 210 includes two input ports (an input port A0 and an input port A1) and two output ports (an output port AT0 and an output port AT1).

The optical transmitter 110 generates two optical signals that are encoded and modulated with the same client data (transmission data) being carriers with the same wavelength, and have different carrier phases.

Specifically, the optical transmitter 110 generates a digital signal (digital time waveform) for generating a desired signal, for example, through digital signal processing of a digital signal processor (DSP) (not illustrated). The optical transmitter 110 converts the generated digital signal to an analog electrical signal using, for example, a digital-to-analog converter (DAC) (not illustrated).

Here, the optical transmitter 110 generates two digital signals of an in-phase component and an orthogonal component. The optical transmitter 110 converts the two generated digital signals to two respective analog electrical signals. This allows the optical transmitter 110 to control a phase of a baseband signal.

The optical transmitter 110 converts the converted analog electrical signal to the optical signal using an optic modulator (not illustrated). The optical transmitter 110 outputs the two generated optical signals from two respective different output ports (optical transmitter output ports). The two output optical signals are input to two input ports (the input port A0 and the input port A1) (first input port) of the directional coupler 210 corresponding to the two output ports, respectively.

Thus, the optical transmitter 110 controls a relative phase difference between the carrier phase of the optical signal output to the optical fiber connected to the input port A0 of the directional coupler 210 and a the carrier phase of the optical signal output to the optical fiber connected to the input port A1 of the directional coupler 210 through digital signal processing so that the relative phase difference becomes a desired relative phase difference.

Even when the optical fiber is a single mode fiber, the optical transmitter 110 can transmit the optical signal through polarization multiplexing because a signal can be placed on each of two different polarizations. In this case, the optical transmitter 110 generates digital signals of I and Q components for the X and Y polarizations, and converts a total of four generated digital signals to respective analog electrical signals to generate a polarized multiplexed optical signal. In this case, the optical transmitter 110 can control the phase of the baseband signal by digitally controlling both of the I and Q components of both of the X and Y polarizations. This allows the optical transmitter 110 to control the carrier phase of the optical signal.

Two optical fibers arriving from the point A (the optical transmitter 110) are connected to the input port A0 and the input port A1 of the directional coupler 210, respectively. An optical fiber directed to the point C is connected to the output port AT0 of the directional coupler 210, and an optical fiber directed to the point D is connected to the output port AT1 of the directional coupler 210.

The directional coupler 210 outputs the optical signal to the output port AT0 when the relative phase difference between the carrier phases of the carriers input to the input A0 and input port A1 is 0 degrees, and outputs the optical signal to the output port AT1 when the relative phase difference between the carrier phases is 180 degrees.

Values of these relative phase differences for use in a determination of an output destination (in the above example, 0 degrees and 180 degrees) are arbitrary, and other relative phase differences (for example, 90 degrees and 270 degrees) may be used.

As illustrated in FIG. 1, the optical receiver 310 includes an input port C0, and the optical receiver 311 includes an input port D0. As shown, the optical signal output from the output port AT0 of the directional coupler 210 is input to the input port C0 of the optical receiver 310 corresponding to the output port AT0 through an optical fiber. The optical signal output from the output port AT1 of the directional coupler 210 is input to the input port D0 of the optical receiver 311 corresponding to the output port AT1 via the optical fiber. A reception process is performed in the optical receiver 310 and the optical receiver 311.

As described above, in the optical transmission system 1 according to the first embodiment, an output port from which the optical signal is output in the directional coupler 210 is selected on the basis of the relative phase difference between the optical signal input to the input port A0 of the directional coupler 210 and the optical signal input to the input port A1 of the directional coupler 210.

That is, in the example described above, when the relative phase difference between the respective carrier phases of the two optical signals input to the directional coupler 210 is 0 degrees, the optical signal is output from the output port AT0 and no optical signal is output from the output port AT1. On the other hand, when the relative phase difference between the respective carrier phases of the two optical signals input to the directional coupler 210 is 180 degrees, the optical signal is output from the output port AT1 and no optical signal is output from the output port AT0.

Thus, in the optical transmission system 1 according to the first embodiment, the optical transmitter 110 controls the relative phase difference between the carrier phase of the optical signal input to the input port A0 of the directional coupler 210 and the carrier phase of the optical signal input to the input port A1 of the directional coupler 210. Thus, the optical transmitter 110 can control the output port (the output port AT0 or the output port AT1) from which the optical signal is output in the directional coupler 210, and can control the path on which the optical signal is transferred (transfer to the point C or transfer to the point D).

As described above, the optical transmitter 110 generates the optical signal that is input to the optical fiber connected to the input port A0 of the directional coupler 210 and the optical signal that is input to the optical fiber connected to the input port A1 of the directional coupler 210 using a DSP, a DAC and an optic modulator and control the carrier phase, but the present invention is not limited to this method. For example, the optical transmitter 110 may be configured to generate one optical signal from a client signal and control the carrier phase thereof using a dependent phase modulator (not illustrated).

When a phase modulator (not illustrated) using an electro-optical effect (EO effect) is used, the optical transmitter 110 can control the carrier phase of the optical signal by placing control phase information as an electrical signal to be applied to phase modulation. Further, when a phase modulator (that is, an acousto-optic modulator (AOM)) (not illustrated) using an acousto-optic effect (AO effect) is used, the optical transmitter 110 can consequently control the carrier phase of the optical signal by applying desired phase modulation to a sinusoidal electrical signal input to the AOM.

Second Embodiment

Hereinafter, a second embodiment of the present invention will be described with reference to the drawings.

Figure 2:
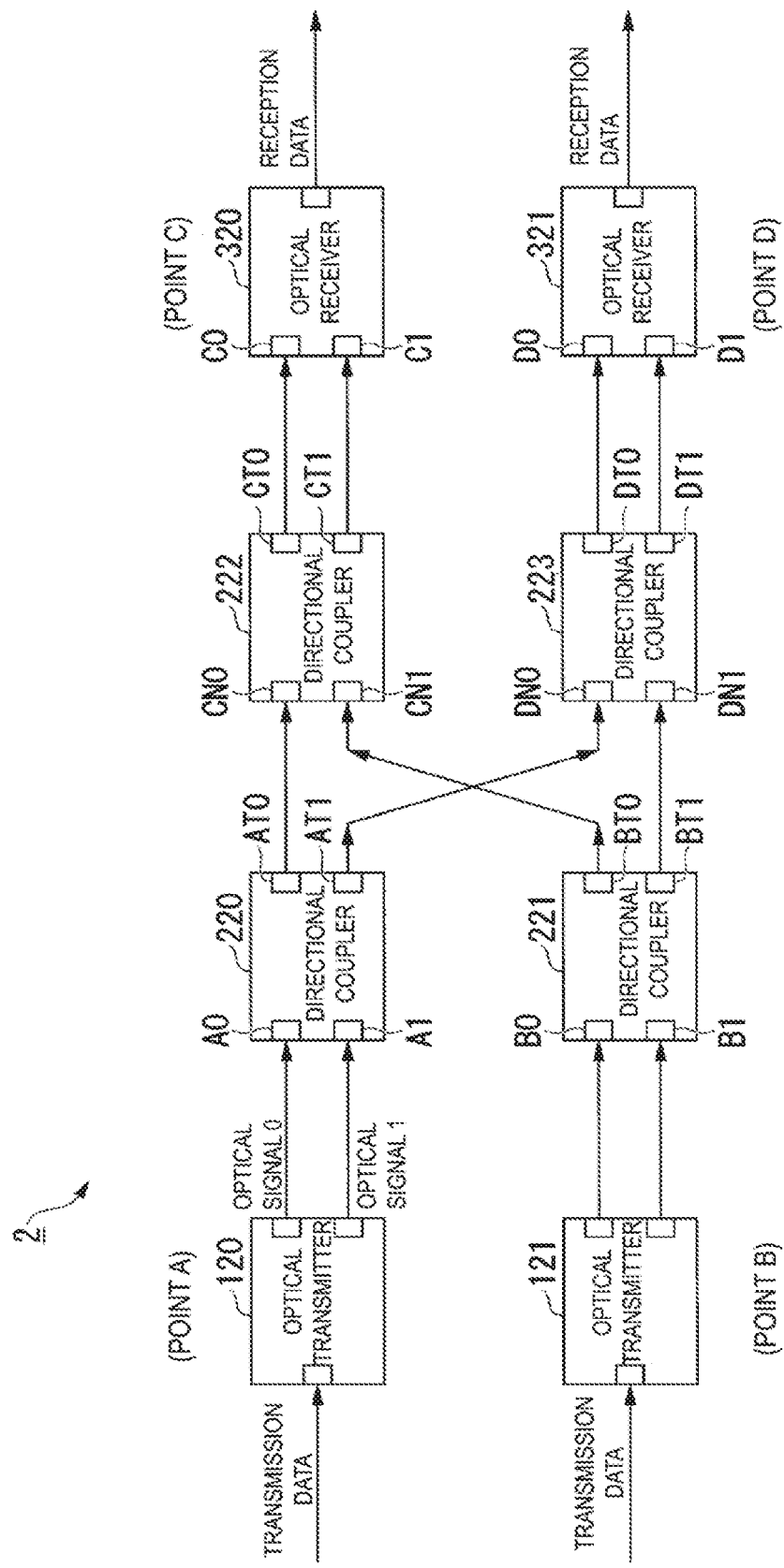
FIG. 2 is a block diagram illustrating a configuration of an optical transmission system 2 according to a second embodiment of the present invention.

FIG. 2 is a block diagram illustrating a configuration of an optical transmission system 2 according to the second embodiment of the present invention. As shown, the optical transmission system 2 includes an optical transmitter 120 (a first optical transmitter) installed at a point A, an optical transmitter 121 (second optical transmitter) installed at a point B, a directional coupler 220 (first directional coupler), a directional coupler 221 (second directional coupler), a directional coupler 222 (third directional coupler), a directional coupler 223 (fourth directional coupler), an optical receiver 320 installed at a point C, and an optical receiver 321 installed at a point D.

The optical transmission system 2 illustrated in FIG. 2 is an example of an optical transmission system that transfers optical signals (a first optical signal and a second optical signal) transmitted from each of two points (the point A and the point B) to any one of two points (the point C and the point D) by selecting paths using the directional coupler 220, the directional coupler 221, the directional coupler 222, and the directional coupler 223.

As illustrated in FIG. 2, two optical fibers connected to two output ports (first optical transmitter output ports) of the optical transmitter 120 installed at the point A are connected to the input port A0 (first input port) and the input port A1 (first input port) of the directional coupler 220, respectively.

An optical fiber directed to the point C is connected to the output port AT0 (first first output port) of the directional coupler 220, and an optical fiber directed to the point D is connected to the output port AT1 (second first output port) of the directional coupler 220.

Further, as illustrated in FIG. 2, two optical fibers connected to two output ports (second optical transmitter output ports) of the optical transmitter 121 installed at the point B are connected to the input port B0 (first input port) and the input port B1 (first input port) of the directional coupler 221, respectively. Further, an optical fiber directed to the point C is connected to the output port BT0 (first second output port) of the directional coupler 221, and an optical fiber directed to the point D is connected to the output port BT1 (second second output port) of the directional coupler 221.

In the optical transmission system 2 according to the second embodiment, the optical transmitter 120 generates two optical signals (first optical signals) that are encoded and modulated with the same client data (first client data) being carriers with the same wavelength, and have different carrier phases. The optical transmitter 120 controls the relative phase difference between the carrier phase of the optical signal (the first optical signal) that is input to the optical fiber connected to the input port A0 of the directional coupler 220 and the carrier phase of the optical signal (the first optical signal) that is input to the optical fiber connected to the input port A1 of the directional coupler 220. It is possible to implement the control of the relative phase difference through digital signal processing in the DSP, as in the first embodiment. As described above, it is also possible to control the relative phase difference using the phase modulator.

In the optical transmission system 2, when a relative phase difference between the carrier phase of the optical signal input to the input port A0 of the directional coupler 220 and the carrier phase of the optical signal input to the input port A1 of the directional coupler 220 is 0 degrees, the optical signal is output from the output port AT0 of the directional coupler 220, and no optical signal is output from the output port AT1 of the directional coupler 220. Further, on the other hand, in the optical transmission system 2, when the relative phase difference between the carrier phase of the optical signal input to the input port A0 of the directional coupler 220 and the carrier phase of the optical signal input to the input port A1 of the directional coupler 220 is 180 degrees, the optical signal is output from the output port AT1 of the directional coupler 220 and no optical signal is output from the output port AT0 of the directional coupler 220.

When the optical signal is output from the output port AT0 of the directional coupler 220, the output optical signal is input to an input port CN0 (second input port) of the directional coupler 222 corresponding to the output port AT0. The directional coupler 222 distributes power based on the optical signal input to the input port CN0 (third input port) to an output port CT0 (third output port) of the directional coupler 222 and an output port CT1 (third output port) of the directional coupler 222.

Further, when the optical signal is output from the output port AT1 of the directional coupler 220, the output optical signal is input to an input port DN0 (fourth input port) of the directional coupler 223 corresponding to the output port AT1. The directional coupler 223 distributes power based on the optical signal input to the input port DN0 to an output port DT0 (fourth output port) of the directional coupler 223 and an output port DT1 (fourth output port) of the directional coupler 223.

On the other hand, in the optical transmission system 2 according to the second embodiment, the optical transmitter 121 generates two optical signals (the second optical signals), which are encoded and modulated with the same client data (second client data) being carriers with the same wavelength, and have different carrier phases. The optical transmitter 121 controls a relative phase difference between the carrier phase of the optical signal (the second optical signal) that is input to an optical fiber connected to the input port B0 of the directional coupler 221 and a carrier phase of the optical signal (the first optical signal) that is input to an optical fiber connected to the input port B1 of the directional coupler 221. It is possible to implement the control of the relative phase difference through digital signal processing in the DSP, as in the first embodiment. As described above, it is also possible to control the relative phase difference using the phase modulator.

When the relative phase difference between the carrier phase of the optical signal input to the input port B0 of the directional coupler 221 and the carrier phase of the optical signal input to the input port B1 of the directional coupler 221 is 0 degrees, the optical signal is output from the output port BT0 of the directional coupler 221 and no optical signal is output from the output port BT1 of the directional coupler 221. On the other hand, when the relative phase difference between the carrier phase of the optical signal input to the input port B0 of the directional coupler 221 and the carrier phase of the optical signal input to the input port B1 of the directional coupler 221 is 180 degrees, the optical signal is output from the output port BT1 of the directional coupler 221, and no optical signal is output from the output port BT0 of the directional coupler 221.

When the optical signal has been output from the output port BT0 of the directional coupler 221, the output optical signal is input to an input port CN1 of the directional coupler 222 corresponding to the output ports BT0.

The directional coupler 222 distributes and outputs power based on the optical signal input to the input port CN1 to the output port CT0 of the directional coupler 222 and the output port CT1 of the directional coupler 222.

Further, when the optical signal is output from the output port BT1 of the directional coupler 221, the output optical signal is input to the input port DN1 of the directional coupler 223 corresponding to the output port BT1. The directional coupler 223 distributes and outputs power based on the optical signal input to the input port DN1 to the output port DT0 of the directional coupler 223 and the output port DT1 of the directional coupler 223.

Hereinafter, a case in which the optical transmitter 120 installed at the point A controls the relative phase difference between the carrier phase of the optical signal input to the input port A0 of the directional coupler 220 and the carrier phase of the optical signal input to the input port A1 of the directional coupler 220 so that the relative phase difference is 0 degrees, and the optical transmitter 121 installed at the point B controls the relative phase difference between the carrier phase of the optical signal input to the input port B0 of the directional coupler 221 and the carrier phase of the optical signal input to the input port B1 of the directional coupler 221 so that the relative phase difference is 180 degrees will be described. In this case, the directional coupler 220 outputs the optical signal from the output port AT0. Further, in this case, the directional coupler 221 outputs the optical signal from the output port BT1.

The optical signal output from the output port AT0 of the directional coupler 220 is input to the input port CN0 of the directional coupler 222 corresponding to the output port AT0. The directional coupler 222 distributes the optical signal input to the input ports CN0 to the output ports CT0 and the output port CT1, and outputs the optical signal to the input port C0 and the input port C1 of the optical receiver 320 installed at the point C.

The optical signals transmitted from the output ports CT0 and the output port CT1 are input to the input port C0 and the input port C1 of optical receiver 320, respectively. The optical receiver 320 combines and decodes the respective optical signals input to the input ports C0 and C1. Thus, the optical signals distributed by the directional coupler 222 are combined by the optical receiver 320 again, thereby reducing noise added in the transmission line. Therefore, it is easy for normal reception to be performed in the optical receiver 320.

On the other hand, the optical signal output from the output port BT1 of the directional coupler 221 is input to the input port DN1 of the directional coupler 223 corresponding to the output port BT1. The directional coupler 223 distributes the optical signal input to the input port DN1 to the output port DT0 and the output port DT1 and outputs the optical signal to the input port D0 and the input port D1 of the optical receiver 321 installed at the point D.

The optical signals transmitted from the output port DT0 and the output port DT1 are input to the input port D0 and the input port D1 of optical receiver 321, respectively. The optical receiver 321 combines and decodes the respective optical signals input to the input port D0 and the input port D1. Thus, the optical signals distributed by the directional coupler 223 are combined by the optical receiver 321 again, thereby reducing noise added in the transmission line. Therefore, it is easy for normal reception to be performed in the optical receiver 321.

Hereinafter, a case in which the optical transmitter 120 installed at the point A controls the relative phase difference between the carrier phase of the optical signal input to the input port A0 of the directional coupler 220 and the carrier phase of the optical signal input to the input port A1 of the directional coupler 220 so that the relative phase difference is 0 degrees, and the optical transmitter 121 installed at the point B controls the relative phase difference between the carrier phase of the optical signal input to the input port B0 of the directional coupler 221 and the carrier phase of the optical signal input to the input port B1 of the directional coupler 221 so that the relative phase difference is 0 degrees will be described. In this case, the directional coupler 220 outputs the optical signal from the output port AT0. Further, in this case, the directional coupler 220 outputs the optical signal from the output port BT0.

The optical signal output from the output port AT0 of the directional coupler 220 is input to the input port CN0 of the directional coupler 222 corresponding to the output port AT0. The directional coupler 222 distributes the optical signal input to the input ports CN0 to the output ports CT0 and the output port CT1, and outputs the optical signal to the input port C0 and the input port C1 of the optical receiver 320 installed at the point C.

On the other hand, the optical signal output from the output ports BT0 of the directional coupler 221 is input to the input port CN1 of the directional coupler 222 corresponding to the output port BT0. The directional coupler 222 distributes the optical signal input to the input port CN1 to the output port CT0 and the output port CT1 and outputs the optical signal to the input port C0 and the input port C1 of the optical receiver 320 installed at the point C.

That is, the optical signal transmitted from the optical transmitter 120 installed at the point A and the optical signal transmitted from the optical transmitter 121 installed at the point B are received by the optical receiver 320 installed at the point C. In this case, the optical signal transmitted from the optical transmitter 120 installed at the point A and the optical signal transmitted from the optical transmitter 121 installed at the point B are overlapped by the directional coupler 222.

Even in this case, the optical receiver 320 can separately receive the two optical signals as long as the optical receiver 320 receives both the optical signals input to the input ports CT0 and the input port CT1. Here, an optical signal obtained by performing 90-degree phase rotation on the optical signal input to the input port CN0 and the optical signal input to the input port CN1 is output from the output port CT0 of the directional coupler 222. Further, an optical signal obtained by performing −90-degree phase rotation on the optical signal input to the input port CN0 and the optical signal input to the input port CN1 is output from the output port CT1 of the directional coupler 222. That is, CT0=CN0+i*CN1, and CT1=−i*CN0+CN1.

Thus, the optical receiver 320 coherently receives the optical signal output from the output ports CT0 of the directional coupler 222 and the optical signal output from the output ports CT1 of the directional coupler 222, and the optical signals are converted to digital signals by an analog to digital converter (ADC) (not illustrated). Further, the optical receiver 320 can apply an inverse matrix through digital signal processing in a DSP to separate the optical signal input to the input port CN0 of the directional coupler 222 and the optical signal input to the input port CN1 of the directional coupler 222.

In practice, it is preferable for distortion or the like in the transmission line to be compensated for and demodulated.

With the configuration of the optical transmission system 2 according to the second embodiment described above, for example, when the relative phase difference between the carrier phase of the optical signal input to the input port A0 of the directional coupler 220 and the carrier phase of the optical signal input to the input port A1 of the directional coupler 220 is 0 degrees, the optical signal is output from the output port AT0 of the directional coupler 220. In this case, the directional coupler 222 reduces power based on the optical signal output from the output port AT0 of the directional coupler 220 in half to output the power from the output port CT0 and the output port CT1. When the optical signals output from the output ports CT0 and the output port CT1 of the directional coupler 220 are input, the optical receiver 320 combines and decodes the input signals.

According to the configuration described above, with the configuration of the optical transmission system 2 according to the second embodiment described above, it is possible to obtain an effect of reducing a signal power input to an optical fiber transmission line necessary to obtain the same signal noise ratio (SNR). Further, with the configuration of the optical transmission system 2 according to the second embodiment described above, it is possible to decrease optical power by using a plurality of optical fibers, and obtain an effect of avoiding waveform distortion due to non-linear effects.

Although diversity reception in which the optical receiver 320 receives both the optical signal input to the input port C0 and the optical signal input to the input port C1 has been described by way of an example in the second embodiment, a configuration in which the optical receiver 320 receives only any one of the optical signal input to the input port C0 and the optical signal input to the input port C1 may be adopted. However, in this case, the optical receiver 320 cannot separate the optical signal input to the input port CN0 of the directional coupler 222 and the optical signal input to the input port CN1 of the directional coupler 222.

It is assumed that crosstalk may occur due to a manufacturing error of the directional coupler, or the like. However, the crosstalk generated by such manufacturing error or the like can be curbed by pre-compensation against the interference and transmission being performed for normality in the optical transmitter.

In an optical fiber transmission line, a temporal variation may occur in a length of an optical phase.

On the other hand, a method is conceivable in which a known pattern used by the optical transmitter 120 installed at the point A is shared between all the nodes (the respective directional couplers), the amount of leakage thereof is detected, an error from an optimal value of a phase control amount is calculated, and feedback is performed for control of the relative phase difference in the optical transmitter 120. Further, a method of transmitting all node pilots, detecting a leak amount, and feeding a detection value back to a node of a transmission point (the optical transmitter 120) is conceivable. In this case, it is important to control the optical transmitter 120 so that a variation is canceled, using pilot light.

Third Embodiment

Hereinafter, a third embodiment of the present invention will be described with reference to the drawings.

Figure 3:
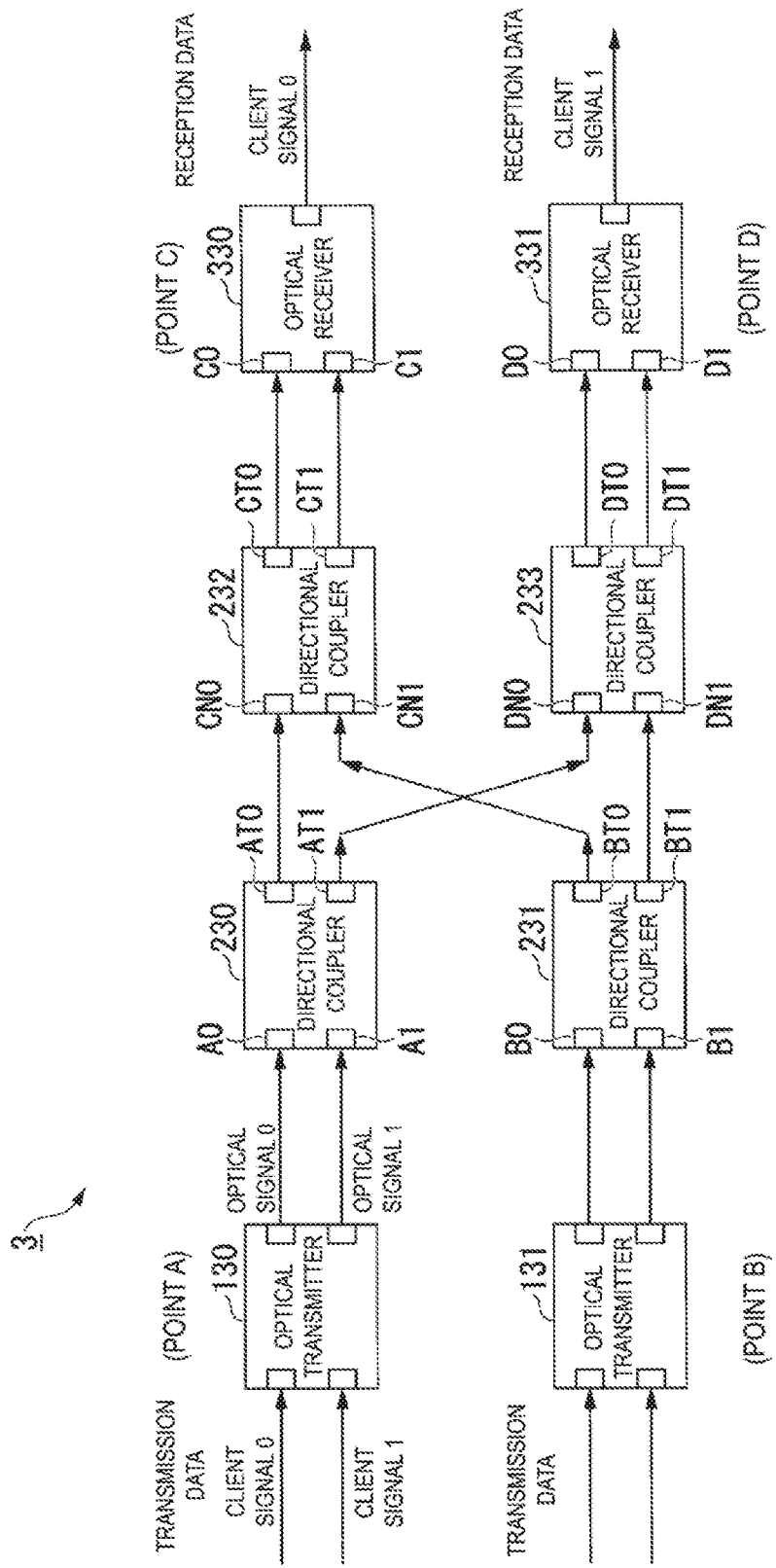
FIG. 3 is a block diagram illustrating a configuration of an optical transmission system 3 according to a third embodiment of the present invention.

FIG. 3 is a block diagram illustrating a configuration of an optical transmission system 3 according to the third embodiment of the present invention. As illustrated, the optical transmission system 3 includes an optical transmitter 120 installed at the point A, an optical transmitter 121 installed at the point B, a directional coupler 220, a directional coupler 221, a directional coupler 222, a directional coupler 223, an optical receiver 320 installed at the point C, and an optical receiver 321 installed at the point D, similar to the optical transmission system 2 according to the second embodiment described above.

In the optical transmission system 3 according to the third embodiment, the optical transmitter 130 installed at the point A transmits two client signals (a client signal 0 and a client signal 1) as transmission data. In this case, when the relative phase difference between the carrier phase of the optical signal input to the input port A0 of the directional coupler 230 and the carrier phase of the optical signal input to the input port A1 of the directional coupler 230 with respect to the optical signal corresponding to the client signal 0 is 0 degrees, the relative phase difference between the carrier phase of the optical signal input to the input port A0 of the directional coupler 230 and the carrier phase of the optical signal input to the input port A0 of the directional coupler 230 with respect to the optical signal corresponding to the client signal 1 is 180 degrees.

The client signal 0 is input to the input port C0 and the input port C1 of the optical receiver 330 installed at the point C via the directional coupler 232 after the client signal 0 has been output from the output port AT0 of the directional coupler 230. On the other hand, the client signal 1 is input to the input port D0 and the input port D1 of the optical receiver 331 installed at the point D via the directional coupler 233 after the client signal 1 has been output from the output port AT1 of the directional coupler 230. In this case, similarly, the optical signal transmitted from the optical transmitter 131 installed at the point B can be transmitted at the same time as well.

Fourth Embodiment

Hereinafter, a fourth embodiment of the present invention will be described with reference to the drawings.

Figure 4:
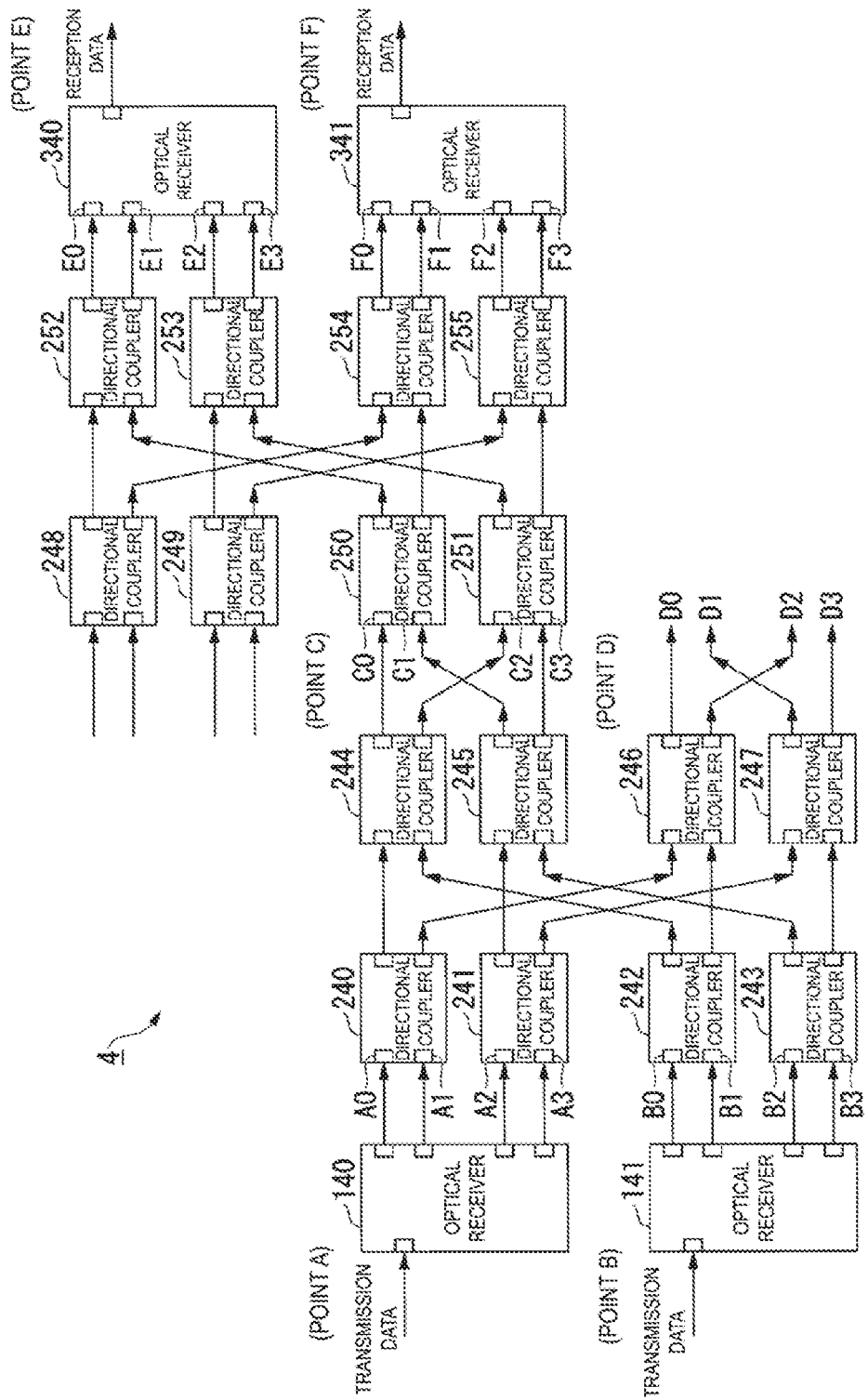
FIG. 4 is a block diagram illustrating a configuration of an optical transmission system 4 according to a fourth embodiment of the present invention.

FIG. 4 is a block diagram illustrating a configuration of an optical transmission system 4 according to the fourth embodiment of the present invention. As shown, the optical transmission system 4 includes an optical transmitter 140 installed at the point A, an optical transmitter 141 installed at the point B, 16 directional couplers (a directional coupler 240 to a directional coupler 255), an optical receiver 340 installed at a point E, and an optical receiver 341 installed at a point F.

Although the optical transmission systems according to the first to third embodiments described above are one-stage optical transmission systems in which one optical transmitter transmits the optical signal to one directional coupler, the optical transmission systems may be optical transmission systems having a multi-stage configuration (multi-layer optical transmission systems) in which one optical transmitter transmits optical signals to a plurality of directional couplers. The optical transmission system 4 illustrated in FIG. 4 is an example of a configuration of a two-stage optical transmission system in which one optical transmitter transmits the optical signal to the two directional couplers.

As illustrated in FIG. 4, in the optical transmission system 4, a first stage node group and a second stage node group have the same configuration.

The first stage node group described herein is a node group including an optical transmitter 140, an optical transmitter 141, a directional coupler 240 (first directional coupler), a directional coupler 242 (third directional coupler), a directional coupler 244 (fifth directional coupler), a directional coupler 246 (sixth directional coupler), a directional coupler 248, a directional coupler 250, a directional coupler 252, a directional coupler 254, an optical receiver 340, and an optical receiver 341.

On the other hand, the second stage node group described herein is a node group including an optical transmitter 140, an optical transmitter 141, a directional coupler 241 (second directional coupler), a directional coupler 243 (fourth directional coupler), and a directional coupler 245 (fifth directional coupler), a directional coupler 247 (sixth directional coupler), a directional coupler 249, a directional coupler 251, a directional coupler 253, a directional coupler 255, an optical receiver 340, and an optical receiver 341.

However, the optical signals are replaced between the input port C1 and the input port C2 at the point C, which is an intermediate point, as illustrated in FIG. 4. Further, the optical signals are replaced between the input port D1 and the input port D2 at the point D, which is an intermediate point, as illustrated in FIG. 4. Thus, in the first stage node group, it is possible to control whether a path serving as an output destination is set to a path directed to the point C or is set to a path directed to the point D by controlling the following relative phase differences. Relative phase difference between the carrier phase of the optical signal input to the input port A0 (first input port) of the directional coupler 240 and the carrier phase of the optical signal input to the input port A1 (first input port) of the directional coupler 240.

Relative phase difference between the carrier phase of the optical signal input to the input port A2 (second input port) of the directional coupler 241 and the carrier phase of the optical signal input to the input port A3 (second input port) of the directional coupler 241.

Further, the following relative phase differences can be controlled through replacement of the optical signal between the input port C1 and the input port C2.

Relative phase difference between the carrier phase of the optical signal input to the input port C0 (fifth input port) of the directional coupler 250 and the carrier phase of the optical signal input to the input port C2 (fifth input port) of the directional coupler 250.

Relative phase difference between the carrier phase of the optical signal input to the input port C1 (fifth input port) of the directional coupler 251 and the carrier phase of the optical signal input to the input port C3 (fifth input port) of the directional coupler 251. Thereby, it is possible to control whether a path that is an output destination is set to a path directed to the point E or a path directed to the point F.

That is, when each of the relative phase difference between the carrier phase of the optical signal input to the input port A0 of the directional coupler 240 and the carrier phase of the optical signal input to the input port A1 of the directional coupler 240 and the relative phase difference between the carrier phase of the optical signal input to the input port A2 of the directional coupler 241 and the carrier phase of the optical signal input to the input port A3 of the directional coupler 241 can be controlled, it is possible to select a path (path E or path F) for transmitting the optical signals input from path A or path B.

However, when distances (that is, optical path lengths) of the plurality of optical fibers between a transmission point and the optical transmission system exactly match each other, the relative phase difference between the carrier phase of the optical signal input to the input port A0 of the directional coupler 240 and the carrier phase of the optical signal input to the input port A1 of the directional coupler 240 is 0 degrees, the relative phase difference between the carrier phase of the optical signal input to the input port A2 of the directional coupler 241 and the carrier phase of the optical signal input to the input port A3 of the directional coupler 241 is also 0 degrees, and the relative phase difference between the carrier phase of the optical signal input to the input port A0 of the directional coupler 240 and the carrier phase of the optical signal input to the input port A2 of the directional coupler 241 is 180 degrees, the relative phase difference between the carrier phase of the optical signal input to the input port A1 of the directional coupler 240 and the carrier phase of the optical signal input to the input port A3 of the directional coupler 240 is also 180 degrees. This allows the optical transmitter 140 to transfer the optical signal to the optical receiver 341 installed at the point F.

Further, in the same principle as described above, when the path is controlled in an optical transmission system having a 3-stage configuration, the number of optical fibers that output the optical signal at a transmission point (optical transmitter) is $2^3$ (that is, 8) for realization. Therefore, when the path is controlled in an optical transmission system having an N-stage configuration (where N is an integer equal to or greater than 1) (in which the number of layers is N), the number of optical fibers that output the optical signal at a transmission point (optical transmitter) is $2^N$ for realization.

Thus, in an optical transmission system having a multi-stage configuration, an optical transmitter generates four or more ($2^N$) optical signals that are encoded and modulated with the same client data being carriers with the same wavelength and have different carrier phases, and outputs the four or more generated optical signals using a plurality of (four or more ($2^N$)) optical transmitter output ports, each of the optical transmitter output ports corresponding to four or more ($2^N$) optical signals.

As described above, when the plurality of optical fibers are connected to the optical transmitter, the optical transmitter overlaps and transmits modulation signals modulated with a plurality of different pieces of transmission data, propagates the modulation signal using the plurality of optical fibers at the same wavelength, and separates the plurality of overlapped modulation signals using the optical receiver. Thus, in the optical transmitter, signals corresponding to the same wavelength that are input to a plurality of optical fibers are collectively generated by one DSP, thereby improving transmission efficiency in some cases.

For example, in the configuration of the optical transmission system 4 illustrated in FIG. 4, the optical signals can be overlapped and transmitted using optical signals encoded with a maximum of four independent different pieces of transmission data as optical signals that are respectively input to the input port A0 of the directional coupler 240, the input port A1 of the directional coupler 240, the input port A2 of the directional coupler 241, and the input port A3 of the directional couplers 241.

In this case, a signal obtained by overlapping the four encoded optical signals is transmitted to each optical fiber. Thus, four client signals are input, an electrical signal for generating optical signals to be input to four optical fibers is realized using one digital signal processing function, and different analog waveforms are generated by four sets of DACs. However, a total of four DACs for two polarizations (X and Y polarizations) two components (I and Q components) are required to generate the optical signal input to each optical fiber. Further, a total of 16 DACs are required to generate inputs to the four optical fibers.

Therefore, it is possible to transmit optical signals for a plurality of clients to the respective optical fibers in a multiplexed manner in an optical region by generating the optical signal for each client, causing the generated optical signal to branch to signals input to a plurality of optical fibers, and controlling the relative phase difference between the carrier phases of the optical signals using a phase modulator, as in the related art.

In the method, because the optical signals interfering with one another that are input to the plurality of optical fibers branch and are generated from one light source, it is not necessary to synchronize the carrier phases of the optical signals again. However, because control of different carrier phases is necessary between the signals input to the respective optical fibers, a configuration capable of individually phase modulation is necessary.

A DAC and a phase modulator that are relatively slow as several Hz to several MHz are sufficient for control of phase modulation. In this case, for example, an AOM with high modulation efficiency, low loss, and less polarization dependency can be used. Further, because it is sufficient to have a slow frequency band unlike wide band signal modulation, it is possible to use a very low-gain electric amplifier disposed between a modulator and a DAC by using an EO modulator having a long interaction length. A method of using a magnetic optical effect is also conceivable.

Phase coherence of the optical signal is important as a configuration of the optical transmitter. Therefore, there is a method of causing light output from one laser to branch and using branch lights as light sources of optical signals that are input to a plurality of optical fibers. In recent years, optical integration is progressing, and light intensity attenuation due to branching can be compensated for by using an optical semiconductor amplifier, a rare earth added optical fiber amplifier, or the like.

Further, an injection synchronization method can also be used in which light of one master laser as a laser for use in the optical transmitter is caused to branch, is injected into a laser serving as a light source of transmission signal light to be input to a plurality of optical fibers, and is synchronized to a phase of the master laser. Further, for a light source laser for optical signals that are input to the plurality of optical fibers, a relative phase can be measured by mixing two lasers for coherent detection. There is also a method of inputting this relative phase to an ADC for digital sampling and digitally controlling a phase of a main signal using a resultant value.

A configuration and method for path selection proposed herein can be applied to wavelength multiplexing transmission because of an independent operation from a wavelength.

As described above, the optical transmission system according to the embodiment of the present invention uses a plurality of optical signals in which carrier phases rather than wavelengths are different. Specifically, an optical transmitter that generates a plurality of optical signals having the same wavelengths, encoded with the same client data, and enabling the carrier phases to be controlled, and at least one directional coupler in which the generated optical signals are connected to different input ports are included.

According to the above configuration, with the optical transmission system according to the embodiment of the present invention, it is possible to control the output port of the directional coupler according to the phase between the optical signals, and thus, it is possible to realize the path control without band constraints and wavelength dependence constraints.

Some or all of the optical transmitter, the directional coupler, and the optical receiver in the embodiment described above may be implemented by a computer. In such a case, the radio wave environment estimation apparatuses 1, 2, 3, and 4 may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. Specific configurations, however, are not limited to those embodiments, and include any design or the like within the scope not departing from the gist of the present invention.

REFERENCE SIGNS LIST 1 to 4 Optical transmission system
110, 120 to 121, 130 to 131, 140 to 141 Optical transmitter
210, 220 to 223, 230 to 233, 240 to 255 Directional coupler
310, 320 to 321, 330 to 331, 340 to 341 Optical receiver

The invention claimed is:

1. An optical transmission system comprising:
an optical transmitter configured to generate a plurality of optical signals encoded and modulated with the same client data being carriers with the same wavelength, and having different carrier phases, and output the plurality of generated optical signals using a plurality of optical transmitter output ports, each of the optical transmitter output ports corresponding to one of the plurality of optical signals; and
one or a plurality of first directional couplers including a plurality of first input ports, each of the first input ports connected to a corresponding one of the plurality of optical transmitter output ports, wherein the one or the plurality of first directional couplers acquire the plurality of generated optical signals and selects paths for the plurality of generated optical signals on the basis of the carrier phases.

2. The optical transmission system according to claim 1, wherein the first directional coupler includes a plurality of first output ports,
the optical transmission system further comprises:
a second directional coupler including a second input port connected to a first first output port, the first first output port being one of the plurality of first output ports, and
a third directional coupler including a third input port connected to a second first output port, the second first output port being one of the plurality of first output ports different from the first first output port.

3. The optical transmission system according to claim 2, wherein the second directional coupler includes a second output port,
the third directional coupler includes a third output port, and
the optical transmission system further comprises
an optical receiver configured to coherently receive a plurality of optical signals output from the second output port or the third output port, and combine and decode the received plurality of optical signals.

4. The optical transmission system according to claim 1, wherein, for each of the plurality of optical signals, a plurality of optical signals obtained by overlapping a plurality of optical signals encoded and modulated with at least one or more other pieces of client data being carriers with the same wavelength as the plurality of optical signals, and having different carrier phases, is generated.

5. The optical transmission system according to claim 1, wherein the first directional coupler detects a temporal variation in optical path length between transmission lines of a plurality of optical fibers and feeds information indicating the detected temporal variation back to the optical transmitter.

6. An optical transmission system comprising:
a first optical transmitter configured to generate a plurality of first optical signals encoded and modulated with the same first client data being carriers with the same wavelength, and having different carrier phases, and output the plurality of generated first optical signals using a plurality of first optical transmitter output ports, each of the first optical transmitter output ports corresponding to one of the plurality of first optical signals;
a second optical transmitter configured to generate a plurality of second optical signals encoded and modulated with the same second client data different from the first client data and being carriers with the same wavelength, and having different carrier phases, and output the plurality of generated second optical signals using a plurality of second optical transmitter output ports, each of the second optical transmitter output ports corresponding to one of the plurality of second optical signals;
a first directional coupler including a plurality of first input ports, each of the first input ports connected to a corresponding one of at least two of the plurality of first optical transmitter output ports, and a plurality of first output ports;
a second directional coupler including a plurality of second input ports, each of the second input ports connected to a corresponding one of at least two of the plurality of second optical transmitter output ports, and a plurality of second output ports;
a third directional coupler including a plurality of third input ports, each of the third input ports connected to a corresponding one of a first first output port being one of the plurality of first output ports, a first second output port being one of the plurality of second output ports; and
a fourth directional coupler including a plurality of fourth input ports, each of the fourth input ports connected to a corresponding one of at least one second first output port being the first output port different from the first first output port and being one of the plurality of first output ports, and at least one second second output port being the second output port different from the first second output port and being one of the second output ports.

7. An optical transmission system comprising:
an optical transmitter configured to generate four or more optical signals encoded and modulated with the same client data being carriers with the same wavelength, and having different carrier phases, and output the four or more generated optical signals using a plurality of optical transmitter output ports, each of the optical transmitter output ports corresponding to one of the four or more optical signals;
one or a plurality of first directional couplers including a plurality of first input ports, each of the first input ports connected to a corresponding one of the plurality of first optical transmitter output ports being two or more optical transmitter output ports among the plurality of optical transmitter output ports, and a plurality of first output ports;
one or a plurality of second directional couplers including a plurality of second input ports, each of the second input ports connected to a corresponding one of a plurality of second optical transmitter output ports being optical transmitter output ports different from the first optical transmitter output ports and being two or more optical transmitter output ports among the plurality of optical transmitter output ports, and a plurality of second output ports;
a third directional coupler including a third input port connected to one of the plurality of first output ports, and a third output port;
a fourth directional coupler including a fourth input port connected to one of the plurality of second output ports, and a fourth output port; and
a fifth directional coupler including a plurality of fifth input ports, each of the fifth input ports connected to a corresponding one of the third output port and the fourth output port.

* * * * *